Nov. 10, 1931.  J. VOORHIES ET AL  1,830,817
FLUID CONDUIT CLOSURE
Filed Oct. 19, 1929
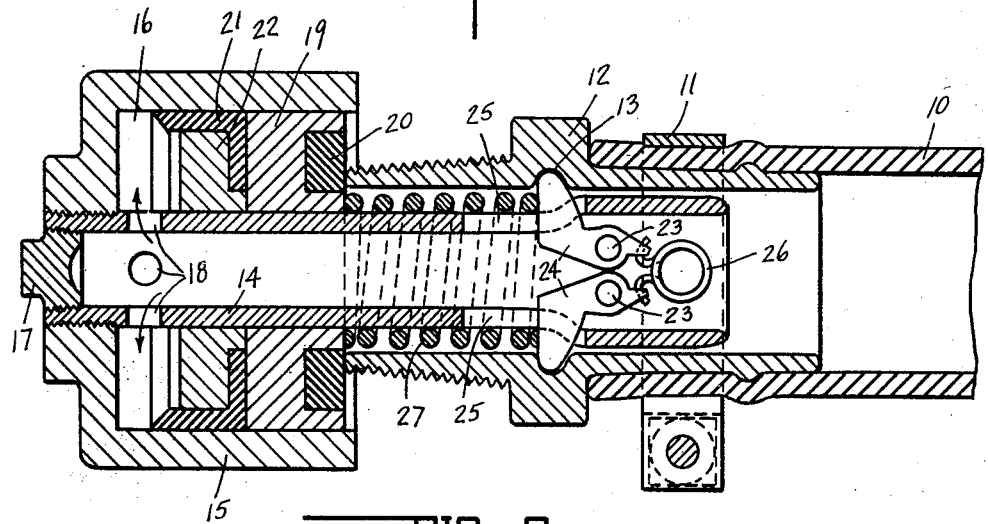
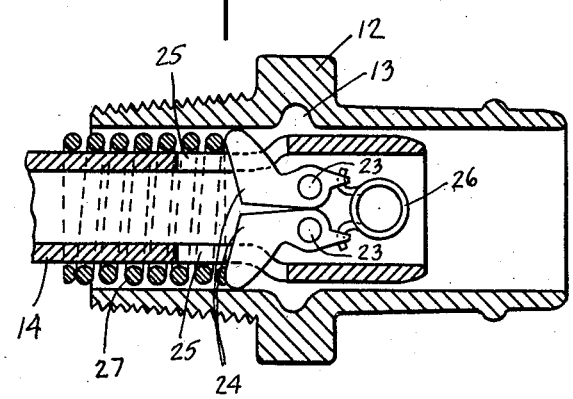
INVENTORS.
WILLIAM R. MILLER.
DONALD W. PEOPLES.
JOHN VOORHIES.
BY
Lockwood Lockwood Goldsmith & Salt
ATTORNEYS.

Patented Nov. 10, 1931

1,830,817

UNITED STATES PATENT OFFICE

JOHN VOORHIES, WILLIAM R. MILLER, AND DONALD W. PEOPLES, OF INDIANAPOLIS, INDIANA

FLUID CONDUIT CLOSURE

Application filed October 19, 1929. Serial No. 400,877.

This invention relates to a closure for the end of a fluid conduit which may be easily and quickly applied and which maintains a fluid tight closure of the conduit as long as fluid pressure exists within the conduit. More particularly it relates to a closure adapted to be applied to the end of such a conduit while the same is being tested under fluid pressure.

In the following description the invention is shown applied to the type of fitting commonly used in attaching the brake pipe hose to the angle cock in railroad practice. When so attached the said hose may be tested under pressure. It is to be understood that this specific description is not to be considered as a limitation of the scope of the invention.

The principal feature of the invention resides in the provision of means for engaging a portion of the device with the interior walls of the conduit together with means for pressing a sealing member against the end of said conduit, either or both of said means being operable responsve to the pressure of fluid in the conduit.

Other objects and features of the invention will be understood from the accompanying drawings and the following description and claims:

Fig. 1 is a central sectional view of the closure device attached to the before-mentioned type of conduit fitting. Fig. 2 is a fragmentary section showing the relation of parts during the inserting and withdrawing of the closure.

In the drawings a portion of brake pipe hose 10 is shown connected by means of a clamp 11 to the type of fitting 12 commonly used for connecting the said hose to the angle cock in railroad practice. The fitting 12 is commonly formed with an annular groove 13 in the interior surface thereof. The closure device includes a hollow cylindrical member 14 which is insertable within the fitting 12. A housing 15 is fastened to the outer end of the cylindrical member 14 and forms a substantially cylindrical chamber 16 surrounding the said member. The outer end of the member 14 is closed by a pipe plug 17 while the inner end of the said member is open to communicate with the interior of the conduit. Holes 18 are provided in the cylindrical member 14 communicating with the interior of the chamber 16. Within the chamber 16 there is provided an annular movable member 19 carrying a sealing ring 20 of rubber or other resilient material. A cup-shaped sealing member 21, preferably of leather, is attached to the movable member 19 by means of a member 22 and serves to prevent passage of fluid between the movable member 19 and the inner wall of the housing 15.

A pair of transversely positioned pivot pins 23 are carried near the inner end of the cylindrical member 14 and a pair of lever members 24 are pivotally mounted thereon. Adjacent the lever member 24 there are provided slots 25 cut in the wall of the cylindrical member 14 through which one end of each of the levers 24 may project. A torsion spring 26 is attached to the opposite end of the levers 24 and normally tends to force these ends apart to the position shown in Fig. 2. In this position the outer ends of the levers are withdrawn sufficiently within the slots 25 to prevent engagement thereof with the internal wall of the fitting 12. A helical compression spring 27 surrounds the cylindrical member 14 and abuts at one end against the lever members 24 and at the opposite end against the movable member 19.

During the insertion of the device in the fitting 12 the parts are positioned as illustrated in Fig. 2 wherein the inner ends of the levers 24 are pressed apart by the spring 26 in turn forcing the spring 27 and the movable members 19 toward the left. In this relation the device may be inserted in the fitting 12 until the outer ends of the lever members 24 are adjacent the annular groove 13. When so positioned, and held in place by the operator, the application of pressure within the conduit forces the movable member 19 to the right as shown in Fig. 1, thereby applying pressure through the spring 27 to the levers 24 to cause the said levers to engage the annular groove 13. The said movement of the member 19 likewise presses the sealing ring 20 firmly against the end of the fitting 12 making a fluid tight joint therebetween.

Upon the removal of the pressure within the conduit, the spring 26 operates to withdraw the lever members 24 from their contact with the groove 13 and the closure may then be withdrawn.

It will be evident that this form of closure may be quickly applied and quickly removed and that, by the use of the device, conduits may be prepared and tested in rapid succession.

The invention claimed is:

1. A portable fluid conduit closure including a housing having a piston chamber therein, a tubular member attached thereto and having a portion insertable in the open end of a conduit, the interior of said tubular member communicating with said piston chamber and with the interior of said conduit, a pair of pivoted levers carried by said tubular member, said levers having portions engageable with a recess in the inner wall of said conduit, a spring for normally retaining said levers out of engagement with said recess, a piston in said piston chamber movable by pressure of fluid from said conduit, a compression spring abutting at one end against said piston and at the other end against said levers and serving to apply a pressure to said levers to force the same into engagement with said recess when a sufficient fluid pressure is applied to said piston, and a sealing ring adapted to be pressed against the open end of said conduit by movement of said piston.

2. A portable conduit closure as set forth in claim 1 characterized by said tubular member and said levers being so formed as to permit fluid pressure upon substantially the entire internal area of said conduit.

3. A portable fluid conduit closure including a housing having a piston chamber therein, a tubular member attached thereto and having a portion insertable in the open end of a conduit, the interior of said tubular member communicating with said piston chamber and with the interior of said conduit, engaging members carried by said tubular member and engageable with a recess in the inner wall of said conduit, means normally operable to prevent said engagement, a piston in said piston chamber movable by pressure of fluid from said conduit, means for imparting movement to said engaging members from the movement of said piston to force the same into engagement with said recess when sufficient fluid pressure is applied to said piston, and a sealing ring adapted to be pressed against the open end of said conduit by movement of said piston.

4. A portable conduit closure as set forth in claim 3 characterized by said tubular member and said engaging members being so formed as to permit fluid pressure upon substantially the entire internal area of said conduit.

5. A portable fluid conduit closure including a housing having a piston chamber therein, an elongated member attached thereto and having a portion insertable in the open end of a conduit, said piston chamber having communication with the interior of said conduit when said member is so inserted, engaging members carried by said elongated member and engageable with a recess in the inner wall of said conduit, a spring for normally retaining said engaging members out of engagement with said recess, a piston in said piston chamber movable by pressure of fluid from said conduit, a compression spring abutting at one end against said piston and at the other end against said engaging members and serving to apply a pressure to said engaging members to force the same into engagement with said recess when a sufficient fluid pressure is applied to said piston, and a sealing ring adapted to be pressed against the open end of said conduit by movement of said piston.

In witness whereof, we have hereunto affixed our signatures.

JOHN VOORHIES.
WILLIAM R. MILLER.
DONALD W. PEOPLES.